(12) United States Patent
Despain et al.

(10) Patent No.: US 7,756,196 B1
(45) Date of Patent: Jul. 13, 2010

(54) EFFICIENT ADAPTIVE FILTERS FOR CDMA WIRELESS SYSTEMS

(75) Inventors: Alvin M. Despain, Los Angeles, CA (US); R. Stockton Gaines, Los Angeles, CA (US)

(73) Assignee: Acorn Technologies, Inc., Santa Monica, CA (US)

( * ) Notice: Subject to any disclaimer, the term of this patent is extended or adjusted under 35 U.S.C. 154(b) by 1432 days.

(21) Appl. No.: 11/098,170

(22) Filed: Apr. 4, 2005

(51) Int. Cl.
*H04B 1/00* (2006.01)

(52) U.S. Cl. .................... 375/152; 375/149; 375/150; 375/316; 375/346; 375/350

(58) Field of Classification Search ................ 375/149, 375/150, 152, 316, 346, 350
See application file for complete search history.

(56) References Cited

U.S. PATENT DOCUMENTS

| | | | |
|---|---|---|---|
| 5,734,598 A | 3/1998 | Abbott et al. | |
| 6,009,089 A * | 12/1999 | Huang et al. | 370/342 |
| 6,064,691 A * | 5/2000 | Banister et al. | 375/149 |
| 6,175,588 B1 | 1/2001 | Visotsky et al. | |
| 6,434,185 B1 * | 8/2002 | Struhsaker et al. | 375/142 |
| 6,922,434 B2 * | 7/2005 | Wang et al. | 375/148 |
| 6,956,897 B1 * | 10/2005 | Honig | 375/232 |
| 7,197,064 B2 * | 3/2007 | Loomis et al. | 375/148 |
| 7,224,718 B2 * | 5/2007 | Chang et al. | 375/145 |
| 7,301,991 B2 * | 11/2007 | Okumura et al. | 375/148 |
| 2002/0065664 A1 | 5/2002 | Witzgall et al. | |
| 2002/0136277 A1 | 9/2002 | Reed et al. | |
| 2002/0152253 A1 * | 10/2002 | Ricks et al. | 708/520 |
| 2003/0035469 A1 * | 2/2003 | Frank et al. | 375/150 |
| 2003/0048430 A1 * | 3/2003 | Morcom | 356/5.01 |
| 2003/0198340 A1 * | 10/2003 | Picciolo et al. | 379/406.01 |
| 2003/0210754 A1 * | 11/2003 | Buchert et al. | 375/346 |
| 2004/0042537 A1 * | 3/2004 | Frank | 375/152 |
| 2004/0151266 A1 * | 8/2004 | Sud et al. | 375/350 |
| 2006/0013292 A1 * | 1/2006 | Despain | 375/152 |
| 2006/0093071 A1 * | 5/2006 | Prasad et al. | 375/329 |
| 2006/0265214 A1 * | 11/2006 | Witzgall et al. | 704/219 |
| 2007/0036202 A1 * | 2/2007 | Ge et al. | 375/141 |

OTHER PUBLICATIONS

International Search Report for PCT/US03/10180, Jul. 30, 2003.

J. S. Goldstein, I. S. Reed and L. L. Scharf, A Multistage Representation of the Wiener filter Based on Orthogonal Projections, IEEE Transactions on Information Theory, vol. 44, No. 7, Nov. 1998.

(Continued)

*Primary Examiner*—Chieh M Fan
*Assistant Examiner*—Siu M Lee
(74) *Attorney, Agent, or Firm*—Orrick, Herrington & Sutcliffe, LLP

(57) ABSTRACT

A CDMA radio system uses an adaptive filter in a receiver to mitigate multipath radio propagation and to filter out interfering signals. Characteristics of an initial stage of the filter preferably are determined by cross correlation of a generated pilot signal and the input signal with the integration of the correlation performed over a time period selected to be an integral number of symbol periods. The integration causes the portions of the cross correlation corresponding to the user subchannels to average substantially to zero, so that the pilot channel signal correlation is the primary contribution to the signal used to characterize the channel to establish the coefficients of the adaptive filter for the receiver.

10 Claims, 11 Drawing Sheets

OTHER PUBLICATIONS

M. L. Honig, and J. S. Goldstein, "Adaptive Reduced-Rank Residual Correlation Algorithms for DS-CDMA Interference Suppression," In Proc. 32th Asilomar Conference Signals, Systems and Computers, Pacific Grove, CA, Nov. 1998.

D. C. Ricks and J. S. Goldstein, "Efficient Architectures for Implementing Adaptive Algorithms," Proceedings of the 2000 Antenna applications Symposium, Allerton Park, Monticello, IL, Sep. 20-22, 2000.

J. S. Goldstein and I. S. Reed, "Reduced-Rank Adaptive Filtering", IEEE Transactions on Signal processing, vol. 45, No. 2, Feb. 1997.

M. L. Honig and W. Xiao, "Performance of Reduced Rank Linear Interference," work supported by U.S. Army Research office under grant DAAH04-96-1-0378, Jan. 2001.

D. C. Ricks, P. G. Cifuentes and J. S. Goldstein, "What is Optimal Processing for Nonstationary Data?" Conference Record of the Thirty Fourth Annual Asilomar Conference on Signals, Systems and Computers, Pacific Grove California, Oct. 29-Nov. 2, 2002.

J. S. Goldstein and I. S. Reed, "Performance measures for Optimal Constrained Beamformers," IEEE Transactions on Antennas and Propagation, vol. 45, No. 1, Jan. 1997.

J. S. Goldstein, I. S. Reed, and R. N. Smith, "Low-Complexity Subspace Selection for Partial Adaptivity", Proceedings of IEE Milcom, Oct. 1996.

W. L. Myrick, M. D. Zoltowski and J. S. Goldstein, "Low-Sample Performance of Reduced-Rank Power Minimization Based Jammer Suppression for GPS," IEEE 6th International Symposium Tech. & Appli., NJIT, New Jersey, Sep. 6-8, 2000.

W. Chen, U. Mitra and P. Schniter, "Reduced Rank Detection Schemes for DS-CDMA Communication Systems," private communication, Jan. 2002.

J. Scott Goldstein, et al., "A New Method of Wiener Filtering and its Application to Interference Mitigation for Communications," IEEE, pp. 1087-1091, 1997.

Colin D. Frank, et al., "Adaptive Interference Suppression for the Downlink of a Direct Sequence CDMA System with Long Spreading Sequences," Part of work was presented at the 36th Annual Allerton Conference on Communication, Control and Computing, Monticello, Illinois, pp. 1-31, Sep. 1998.

Samina Chowdhury, et al, "Reduced-Rank Chip-level MMSE Equalization for the 3G CDMA Forward Link with Code-Multiplexed Pilot," Invited Paper for Special Issue of EURASIP Journal on Applied Signal Processing, pp. 1-27, Jul. 2001.

Belkacem Mouhouche, et al., "Chip-Level MMSE Equalization in the Forward Link of UMTS-FDD: A Low Complexity Approach," IEEE, pp. 1015-1019, 2003.

M. Joham, et al., "A New Backward Recursion for the Multi-Stage Nested Wiener Filter Employing Krylov Subspace Methods," pp. 1-4.

Michael L. Honig, "Adaptive Reduced-Rank Interference Suppression Based on the Multistage Wiener Filter," IEEE Transactions on Communications, vol. 50, No. 6, pp. 986-994, Jun. 2004.

EPO Communication dated Jun. 20, 2008 regarding Application No. 03 726 180.7-2215.

Saeed V. Vaseghi, "Wiener Filters," Advanced Digital Signal Processing and Noise Reduction, Second Edition, pp. 179-204.

* cited by examiner

EFFICIENT ADAPTIVE FILTERS FOR CDMA WIRELESS SYSTEMS

BACKGROUND

1. Field of the Invention

The present invention relates generally to the processing of signals in CDMA wireless systems such as CDMA cellular radiotelephone systems. More particularly, the present invention relates to the equalization and filtering by an adaptive filter (AF) of a CDMA signal that may have been corrupted by distortion, noise and interference during transmission from the base station to the user handset.

2. Description of the Related Art

Code division multiple access or CDMA techniques are gaining popularity in current and next generation wireless networks as an efficient way of improving capacity, both with regard to the number of users and the achievable bit rates. Examples of CDMA wireless networks include those that operate according to the IS-95 standard, currently in use in the United States for mobile cellular telephone networks, and those networks using successor technologies such as CDMA 2000 and the near term successor technology, CDMA 2000-1x. Another CDMA technology gaining acceptance is WCDMA. This background discussion and the subsequent discussion of implementations of the invention make specific reference to the structure and implementations of CDMA 2000-1x. This is not intended to be limiting. The invention described below can be applied to the various versions of CDMA 2000, to various versions of WCDMA and to other successor technologies.

Because CDMA signals simultaneously occupy a given frequency band and an arbitrarily long time interval, CDMA systems use codes that identify users to achieve multiplexing (code division) of users. Different base stations (corresponding for example to different cells) need isolation within the CDMA system so that a receiver can readily distinguish between base stations. Generally the isolation between base stations is accomplished with another code, different from the code that identifies users. As such, the CDMA 2000-1x system, like its predecessor IS-95, uses orthogonal codes (e.g., Walsh codes) to identify or isolate user subchannels and system control subchannels, and uses maximal length sequences (e.g., pseudo-noise "PN" codes) to identify or isolate different base stations. The service provider reuses a given frequency band within its network by employing it in cells that are spaced apart by a sufficient distance so that the cells do not unduly interfere with each other's transmissions when the PN codes employed by adjacent cells are different. This difference can be as simple as a significant time displacement between two copies of the same PN code. This is, for example, the approach employed in the CDMA 2000 system.

WCDMA operates similarly. In WCDMA, the functions that separate individual user subchannels are called orthogonal variable spreading functions (ovsf). Where the terms "Walsh function" or "Walsh code" are used in the following discussion, they are intended to include the orthogonal variable spreading functions as well as other similarly used orthogonal functions or codes.

A CDMA base station constructs its downlink signal by assigning each subchannel an identifying Walsh code or other orthogonal code and using that orthogonal code to spread the subchannel's signal. Unique orthogonal codes are assigned to the user subchannels so that a receiver can select its subchannel from the base station broadcast and reject the other subchannels using the code. The base station also modulates the user's signal with a PN code (and/or a time shifted version of a common PN sequence) specifically identifying that base station on the network. Each base station uses the first subchannel as a pilot channel by sending a known data stream, generally consisting of all 1's, over the channel. The pilot channel is used by terminal receivers to identify and lock onto the signal from a desired base station. A second of the base station's subchannels (the sync channel) is employed to transmit control information to the receiver terminals. Most of the bits transmitted on the sync channel are predictable. The other base station subchannels contain (from the receiver viewpoint) more or less random user bits.

Interference sources of concern to receivers in a CDMA system include multipath signals arriving within the time window (the delay spread of, e.g., 14 µs) used by a receiver for observing signals. Other interference sources include the downlink signals from base stations other than the one the receiver is using for communication. The Walsh codes and PN codes are designed to prevent interference between subchannels and with other base stations. Some interference is inevitable. Although separate PN sequences are nearly (or are forced to be) orthogonal to each other, the orthogonality condition requires an integration time as long as the code. Generally, the symbol period consists of a number of chips that represent the period of the Walsh code. The symbol period is often 64 chips for IS-95 and CDMA-2000 systems, and can be between four chips and 512 chips for various CDMA systems. Therefore, the typical observation intervals are too short relative to the codes to achieve complete orthogonality relative to physically adjacent base stations to prevent interference from such base stations. This interference is reduced by the code properties but is dependent on the power of the signals from other base stations at the receiver, which can be higher than the power from the desired base station when fading is present.

The simultaneous presence of all the subchannels and the use of both a subchannel code (orthogonal or Walsh code) and a base station code (e.g., PN code) make it difficult to use equalization techniques to increase the capacity of existing CDMA networks, including CDMA 2000 networks.

SUMMARY OF THE PREFERRED EMBODIMENTS

An aspect of the present invention provides a communication system including a receiver having an adaptive filter coupled to receive an input signal comprising a plurality of user signals and a pilot signal. The input signal is characterized by a symbol period defined by a CDMA transmitter. The adaptive filter has at least one filter coefficient determined in part from a multiplication of the input signal by a synthesized pilot signal. The synthesized pilot signal is synchronized with the input signal and the multiplication is performed as a single series of signed addition operations between respective companies of the input signal and the synthesized pilot signals.

Another aspect of the invention provides a communication system including a receiver having an adaptive filter coupled to receive an input signal comprising a plurality of user signals and a pilot signal. The input signal is characterized by a symbol period defined by an orthogonal code modulation and the adaptive filter has at least one filter coefficient determined in part from a multiplication of the input signal by a synthesized pilot signal with a result integrated over an integration interval spanning a first through a last symbol time. The adaptive filter decodes a received symbol, received at a time intermediate between the first and the last symbols, using at least one filter coefficient.

Still another aspect of the invention provides a communication system including a receiver having an adaptive filter coupled to receive an input signal comprising a plurality of user signals and a pilot signal, the input signal characterized by an orthogonal code modulation. The adaptive filter has a matched filter stage that filters at least a portion of the input signal and a prestage filter that filters the input signal using a level of precision lower than the matched filter stage and identifies a set of filter elements within the matched filter stage. The matched filter stage filters at least a portion of the input signal using the set of filter elements identified by the prestage filter.

Another aspect of the invention provides a communication system including a receiver. The receiver includes an adaptive filter coupled to filter an input signal comprising a plurality of user signals and a pilot signal, the input signal having an orthogonal code modulation defined by a transmitter. The adaptive filter includes at least one filter stage that determines at least one set of filter coefficients by averaging or integrating over two or more orthogonal code periods. The adaptive filter includes a prestage filter receiving N elements of the input signal and identifying from the N elements of the input signal a set of M elements for processing within the adaptive filter. The adaptive filter filters the input signal using M elements in each stage of one or more other stages of the adaptive filter, the prestage operating at lower precision than any of the one or more other stages of the adaptive filter.

Another aspect of the invention provides a communication system including a receiver. The receiver includes an adaptive filter coupled to filter an input signal comprising a plurality of user signals and a pilot signal, the input signal modulated by one or more orthogonal codes defined by a transmitter. The adaptive filter has at least one filter coefficient determined in part from a multiplication of the input signal by a synthesized pilot signal. The synthesized pilot signal is synchronized with the input signal. A selector in the adaptive filter receives N elements of the input signal and selects from the N elements of the input signal a set of M elements having predetermined amplitude for processing within portions of the adaptive filter. The adaptive filter filters the input signal using M elements in one or more stages of the adaptive filter.

Another aspect of the invention provides a communication system including a receiver. The receiver includes an adaptive filter coupled to filter an input signal comprising a plurality of user signals and a pilot signal, the input signal modulated by one or more orthogonal codes defined by a CDMA transmitter. A selector in the adaptive filter receives N elements of the input signal and selects from the N element input signal a set of M elements to provide an M element input signal for processing within portions of the adaptive filter. A first matched filter stage in the adaptive filter receives, adapts to and filters the N element input signal, wherein the first matched filter stage determines at least one filter coefficient from a cross correlation between at least a portion of the input signal and a reference signal generated by the receiver using an integration over one or more orthogonal code periods in the cross correlation. A second filter stage in the adaptive filter receives, adapts to and filters the M element input signal using at least in part M element operations.

BRIEF DESCRIPTION OF THE DRAWINGS

Preferred exemplary embodiments of the present invention are described here with reference to the accompanying drawings, which form a part of this disclosure, and in which like numerals denote like elements.

DETAILED DESCRIPTION OF THE PREFERRED EMBODIMENTS

Figure 1:
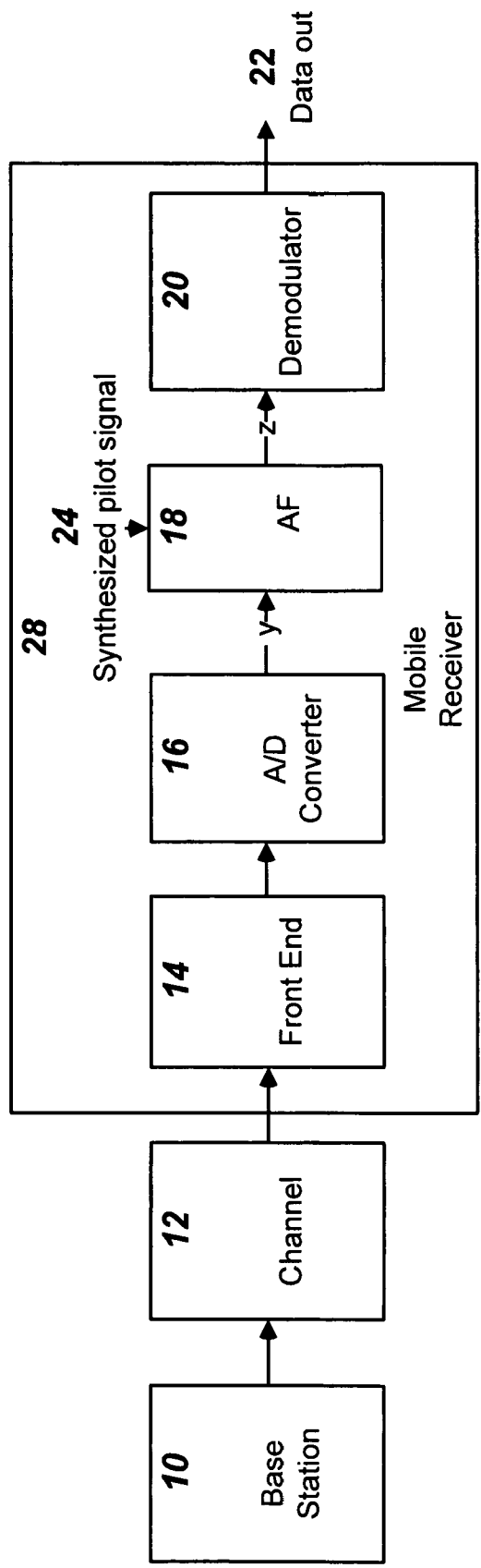
FIG. 1 illustrates a preferred implementation of a downlink CDMA system. A particularly preferred adaptive filter, for example as illustrated in FIG. 2, 8 or 10, is provided between the digitizer and the receiver demodulator.

One of the most common wireless applications is in cellular telephone communications. Cellular telephone communication often involves mobile receivers and rapidly changing multipath or physical delay environments. Other types of wireless receivers such as cellular modems face similar challenges. In some extreme environments, the wireless communications channel can change significantly over a few centimeters and mobile receivers can move many centimeters per second. The rapidly changing multipath environment makes it difficult to use adaptive filters in mobile wireless communication applications. This problem is made more difficult for code division multiple access (CDMA) wireless communication, where receivers conventionally demodulate one or more levels of orthogonal and other codes before performing channel analysis and compensation.

Preferred embodiments of the present invention provide an adaptive filter for a CDMA wireless system that can perform equalization without decoding the encoded signals transmitted by the system. Certain preferred implementations characterize the physical spectrum of a CDMA downlink channel using data received from the channel to determine an initial set of matched filter coefficients based on the instantaneous characterization of the channel. These implementations use the resulting set of matched filter coefficients to filter the same data received from the channel that was used to determine the initial set of filter coefficients. These preferred implementations are best characterized as feed-forward adaptive filters. The discussion here uses the term "adaptive filter" in its broad sense as being a filter that considers its environment and responsively changes the filter.

Instead of decoding the input signal to obtain a signal sufficiently understandable for channel analysis, preferred implementations of the present invention analyze the channel using a predictable portion of the input signal received from the channel. For example, the pilot channel of the received signal is predictable and can be extracted and used to characterize the channel. These preferred implementations perform a correlation with, for example, the known pilot signal to remove unpredictable portions of the input signal and to isolate the predictable portions (e.g., the pilot channel) of the input signal. This correlation is used to establish the coefficients of a matched filter. The matched filter determined in this way is free of feedback effects, is derived from observations of the channel over a short interval (preferably one half to one millisecond) and is substantially the optimal filter for the channel, assuming no noise or interference. The resulting matched filter resolves multipath contributions, delays the different contributions as appropriate and coherently combines the multipath contributions. Additional filtering after the matched filter, preferably adaptive filtering, preferably further refines the received signal.

The matched filter coefficients preferably are determined on the basis of, for example, the PN code (for CDMA-2000), the orthogonal variable spreading factor code or the Gold code (a special PN code for WCDMA) (and possibly the fixed Walsh code) of the pilot channel, as appropriate, which are known and can be directly generated in the CDMA receiver. For each subchannel other than the pilot channel in a CDMA 2000 system, the Walsh code function has a value of zero when averaged over a Walsh period. A preferred CDMA receiver cross correlates the raw received signal with a receiver-generated, synchronized replica of the PN code signal, with the integration or averaging aspects of the cross correlation performed over an integral number of complete Walsh code periods. Because of the orthogonality of the Walsh codes over the Walsh period, the individual traffic channels (excluding the pilot channel), average to zero or close to zero when cross correlated and integrated over a number of complete Walsh periods.

Only the contribution from the pilot channel is substantially different from zero in this cross correlation. In existing CDMA 2000 systems, for example, the pilot channel data are a constant series of binary 1's. The pilot channel is spread by the zeroth order Walsh function, which is also all 1's. The spread pilot channel data are consequently all 1's. When the spread pilot channel data are combined with the PN code, the resulting signal is the PN code itself. The pilot channel is always a known quantity and can be generated by the receiver and used in adapting the CDMA filter.

Cross correlating the received signal with the receiver-generated PN code identifies the multiple paths of the signal from the base station to the receiver that arrive within the "delay spread" observation window (e.g., 14 μsec). Identifying these paths characterizes the physical delay characteristics of the channel and allows the matched filter to be determined according to the instantaneously detected characteristics of the channel.

Integration or, equivalently, a moving average with either the integration or moving average performed over an integer number of Walsh code periods, is a preferred strategy for characterizing the channel. Other adaptive filter parameters are also preferably determined using integration or moving averages over an integer number of Walsh periods. Preferably the integration or averaging is performed starting where a new symbol begins and ending where a symbol ends.

Though the preceding discussion is presented in terms of a known pilot subchannel, the content of other subchannels, such as the synch channel, may be known or may be estimated and used in the manner described here to estimate filter parameters instead of using the pilot subchannel to estimate filter parameters.

FIG. 1 illustrates a downlink for a CDMA system according to aspects of the present invention. On the left is the base station transmitter 10. The base station 10 feeds the physical propagation channel 12. As illustrated, the physical propagation channel 12 includes distortions such as additive white Gaussian noise, Rayleigh fading and multipath. The front-end 14 of the receiver in the handset receives signals from the physical propagation channel 12, and the front end 14 of the receiver converts the received signal to baseband. In this example the analog-to-digital converter 16 within the receiver digitizes the baseband signal output by the front end 14. The analog-to-digital converter 16 (digitizer) sends the digitized baseband signal to the adaptive filter 18. The adaptive filter 18 acts in the FIG. 1 downlink to compensate for multipath effects in the communication channel 12 and to filter out interfering signals. The output of the adaptive filter is provided to channel demodulator 20 for extracting the sub-channels of interest. The demodulator 20 extracts the pilot channel, the sync channel, etc., and the user traffic channel or channels and sends them 22 to the remaining handset circuits.

For preferred implementations of a receiver according to the invention, a searcher is utilized to pick out a group of strong path signals that fall into a time window whose width is set by the expected delay spread of signals from a single base station to a handset that is serviced by that base station. For example, in CDMA-2000-1x the delay spread is assumed to be about fourteen microseconds or about sixteen chip times and so that is selected as the window width. In preferred implementations of the present invention, the searcher preferably aligns the generated PN sequence with the center of a window containing the group of strong path signals rather than to a single strong signal. The searcher synchronizes a local clock and PN sequence generator with the base station signal. The clock signal, the generated pilot PN sequence and the stream of sampled received signal values are input to the adaptive filter 18 within the preferred receiver of FIG. 1.

The adaptive filter 18 of FIG. 1 (and, hence, the filters of FIGS. 2, 8, 9 and 10 below) frequently correlates a portion of the PN code or another pseudo-random scrambling code with a portion of the sampled signal. This correlation is performed using a locally generated version of the PN code, generated synchronously with the received signal. The PN code therefore consists of a sequence of elements that are complex numbers. Each element has the special property that both the real and imaginary parts are either +1 or −1. As a consequence, the multiplication of each element of the PN code with the corresponding element of the sampled signal can be implemented with two additions instead of with multiplies, greatly reducing the cost of calculating the correlation, and simplifying the implementation of the circuitry.

To see this, let $p_j$ be the $j^{th}$ element of the portion of the PN code used in a specific correlation, and $s_j$ be the corresponding sample from the received signal. Let $p_j=a_j+ib_j$ and $s_j=c_j+id_j$. Then the product of the $j^{th}$ element $p_j$ of the PN code and the $j^{th}$ element of the signal $s_j$ is $(a_jc_j-b_jd_j)+i(a_jd_j+b_jc_j)$. Since $a_j$ and $b_j$ are both +1 or −1, the adaptive filter's correlation preferably is carried out by additions of signed quantities. This correlation strategy can be applied generally to other filter implementations where the correlation of the PN code with a sampled signal is performed. It will of course be appreciated that any multiplication can be represented as repeated additions. That is not what is meant here, as that would not represent any reduction in complexity. Rather, the additions used here in place of multiplications consist of a single series of additions between the real and imaginary elements of the sampled input signal and the corresponding real and imaginary elements of the locally generated and synchronized version of the PN code.

The adaptive filter 18 of FIG. 1 is preferably a multistage adaptive filter that characterizes the communication channel multipath structure 12 and uses that characterization to adapt at least an initial filter stage to the communication channel. The remaining stages of the preferred multistage adaptive filter are adaptively determined to filter out noise, interference and other artifacts from the received signal. The adaptive filter 18 of FIG. 1 preferably utilizes the known pilot channel signal to adapt at least the initial stage of the filter. In particular, at least one of the filter coefficients is preferably calculated by integrating the instantaneous estimates of the filter coefficients over one or more orthogonal or Walsh function periods. This integration ensures that all the unknown user signals encoded by the orthogonal (e.g., Walsh or ovsf) functions substantially cancel out leaving the effect of the pilot subchannel, which allows the receiver to determine the filter coefficients. Since the communication channel changes slowly relative to the preferred integration time, the adaptive filter can integrate over many symbols while still tracking channel changes and adapting to interfering signals.

A particularly preferred implementation of the present invention uses a multistage Wiener filter (MWF) as the adaptive filter 18 in FIG. 1, which adds to the matched filter stage discussed above subsequent stages that adapt to and filter noise and interference. Each of the MWF stages may include an integration or moving average process over an integer number of Walsh periods to determine or refine the coefficients of the filter. Most preferably, these additional filter stages are also implemented so as to limit their channel memory and to emphasize the instantaneous characterization of the channel. There are a number of different adaptive filters in which aspects of the present invention might be implemented, including adaptive matched filters, adaptive Kalman filters, and the adaptive Wiener filters mentioned here.

The various aspects of the present invention can be implemented in various types of adaptive filters. The Wiener filter is an adaptive filter of special interest here as it is the optimal linear filter for processing received signals. The Wiener filter is defined as the vector $\underline{w}$ that satisfies the matrix equation R $\underline{w}$=$\underline{r}$, where R is the covariance matrix of the received signal that is presented to the Wiener filter and $\underline{r}$ is the cross correlation vector of the received signal and the signal sent into the communication channel for transmission. The time-domain form of the Wiener filter is typically implemented as a finite impulse response (FIR) filter that consists of a tapped delay line with all the tap signals weighted and summed to produce the filter output. Specifying the weight vector $\underline{w}$ to be applied to the tap signals prior to summing is one way of describing this implementation of a Wiener filter.

A Wiener filter may be adapted by repeatedly calculating the covariance matrix R and the cross correlation vector $\underline{r}$ and repeatedly solving for the weight vector $\underline{w}$ at a rate sufficient to capture the dynamic changes in the characteristics of the communication channel. Then the set of weights $\underline{w}$ is used for the FIR filter in filtering the received signal. This can be expensive to accomplish. For the CDMA systems of interest here, it is difficult to directly calculate a consistent cross correlation vector $\underline{r}$ and covariance matrix R. On the other hand, there are methods to achieve Wiener filtering without having to explicitly solve the Wiener equation for $\underline{w}$. Some of these methods do not require calculation of the matrix R but only parameters easily calculated for CDMA systems of interest. An especially advantageous class of Wiener filter, the multistage Wiener filter, can be relatively inexpensive to implement.

The multistage Wiener filter used in particularly preferred embodiments of the present invention captures the physical channel delay characteristics in the initial stage $\underline{h}_1$. Preferably, the first stage matched filter $\underline{h}_1$ is calculated by correlating the generated PN code stream with the input received signal vector $\underline{y}_0$ and then normalizing. The characteristics of interfering signals are captured in the other $\underline{h}$ filters of the following stages. The multistage Wiener filter implementations then optimally combine the outputs of all the filter stages to derive the equalized output, which is then sent to the demodulator (20 in FIG. 1) to recover the user data.

The pilot channel need not be explicitly extracted to calculate the Wiener or other adaptive filter weights.

Figure 2:
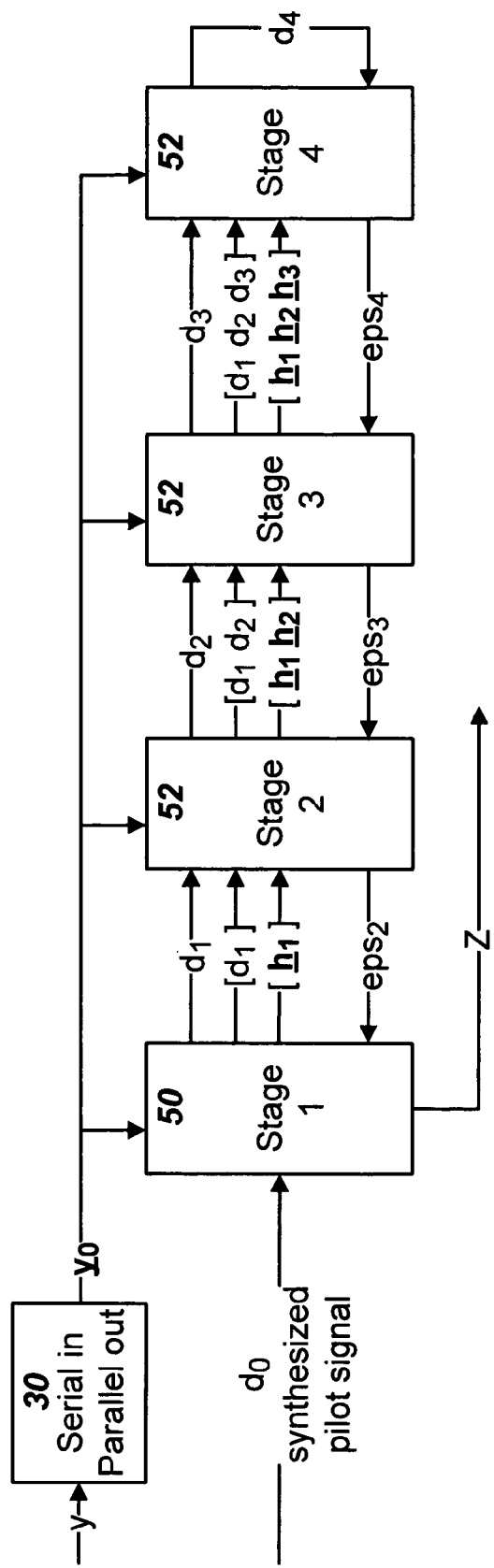
FIG. 2 illustrates the structure of an adaptive version of the Despain multistage Wiener filter. The FIG. 2 Despain adaptive filter has an initial stage as illustrated in FIG. 3 and three stages as illustrated in FIG. 4.

FIG. 2 illustrates an adaptive Despain multistage Wiener filter that can be used as the filter 18 in the FIG. 1 downlink. Four stages are illustrated for the FIG. 2 implementation of the Despain adaptive filter. One can construct larger or smaller filters by either adding or removing stages. There will be an optimal number of stages for a given application and the optimal number of stages can be determined empirically or by simulation. The vector $\underline{y}_0$ preferably is sent in parallel to all stages, which speeds the filter operation.

The receiver synthesizes the reference pilot signal in the usual way and the receiver searcher (not shown) approximately aligns the synthesized pilot signal with a group of the strongest received pilot signals (signal paths) that are grouped within a time window. The time window is defined by the length of shift register 30 and is chosen to be about fourteen microseconds for CDMA 2000-1x systems. The output of shift register 30 is a vector of samples $\underline{y}_0$. Shift register 30 provides a serial to parallel channel reorganization of the received signal y to the parallel vector $\underline{y}_0$.

The vector $\underline{y}_0$ is produced by sampling the down converted signal from the antenna. The rate of sampling should be at least the same as the chip rate, so that there will be at least one observation for each chip. It may be preferable to oversample, for example, by two or four times. There is no requirement that the interval between samples, or the sampling rate, be constant. For practical purposes, the sampling rate is usually chosen to be constant. The length of the vector $\underline{y}_0$ will be the number of chips comprising the delay spread times the degree of oversampling. For example, if sixteen chip times covers the desired delay spread, then the length of $\underline{y}_0$ for two times oversampling will be thirty-two elements.

In the Despain adaptive filter implementation of FIG. 2, the first stage 50 is different from the subsequent stages 52. The structure of the initial stage 50, shown in FIG. 3, preferably is a simplification of the circuit employed for the subsequent stages. The structures of the other stages 52 are shown in FIG. 4. Initial stage 50 has three parts, a forward substage 54, an update substage 56 and a reverse substage 58.

The forward substage 54 forms the dot product 55 of the input signal vector $\underline{y}_0$ and the filter coefficients $\underline{h}_1$. The result generated is the intermediate signal $d_1$. This signal is sent on to the next stage of the filter as a scalar and also as a one element vector. The initial update substage 56 has as inputs the vector input signal $\underline{y}_0$ and the synthesized pilot signal $d_0$. $\underline{y}_0$ is multiplied 48 by the complex conjugate 46 of the synthesized reference pilot signal $d_0$ and the result is integrated by the moving average block 60. Most preferably the integration is performed over a number of complete periods of the Walsh or orthogonal code, as appropriate to the system. The integration is preferably performed over a number of code periods appropriate to limit noise while avoiding unacceptable variations in the channel characteristics. Through simulations on realistic CDMA environments, the present inventors have observed that integration intervals of eight to sixteen symbols are appropriate for the first, matched filter stage of the FIG. 2 adaptive filter. Performance for such an integration interval is substantially improved as compared to a conventional rake receiver in the same CDMA environment. The result from the moving average block 60 is a vector that is sent to a normalization block 62 that outputs the normalized filter vector $\underline{h}_1$. The $\underline{h}_1$ vector will have a magnitude of unity. The normalized filter vector $\underline{h}_1$ is sent to the initial forward substage 54 and also to the second stage.

In the initial stage, the moving average block 60 integrates the instantaneous estimate of the forward filter stage coefficients to reduce or eliminate all received signal influences except that of the pilot channel signal. The moving average may be computed by summing an initial span and then averaging. Subsequent values are computed by adding in a number n (greater than or equal to one) of new elements to the sum, subtracting the n oldest elements, and computing the new average. In moving average block 60, one value, for example, is added to the sum and one subtracted at each step. The number of items summed (the length of the span or the window width) represents one or preferably more complete periods of the Walsh function or ovsf.

A slightly less effective but also somewhat less computationally expensive method of correlation and integration is to divide the intermediate signal to be integrated into a series of blocks in which the block length corresponds to a number of complete Walsh code periods, preferably beginning at the start of a Walsh period. The moving average block 60 may alternately be implemented in this way. Integration is then performed, block by block. Preferably the length of integration is selected to be long enough to sufficiently reduce noise and short enough for the channel characteristics to not vary excessively.

The moving average block 60 preferably cancels out the effects of the subchannel signals other than the pilot channel signal for the initial, matched filter stage. The cancellation is due to the orthogonality of the Walsh or orthogonal codes and due to the integration over the respective complete Walsh or orthogonal code periods. Preferably the integration interval is chosen to be a number of complete code periods. This reduces the effects of noise. The integration interval is, on the other hand, limited in duration so that the channel does not change appreciably over the integration interval. Simulations of practical systems are preferably used to determine an appropriate integration interval (measured in complete code periods), whether for this multistage Wiener filter embodiment or for other adaptive filters according to this invention. Because it may be desirable to use one integration interval for the initial, matched filter stage and a different interval for subsequent stages, it may be desirable to use simulations to set the different integration intervals.

Figure 3:
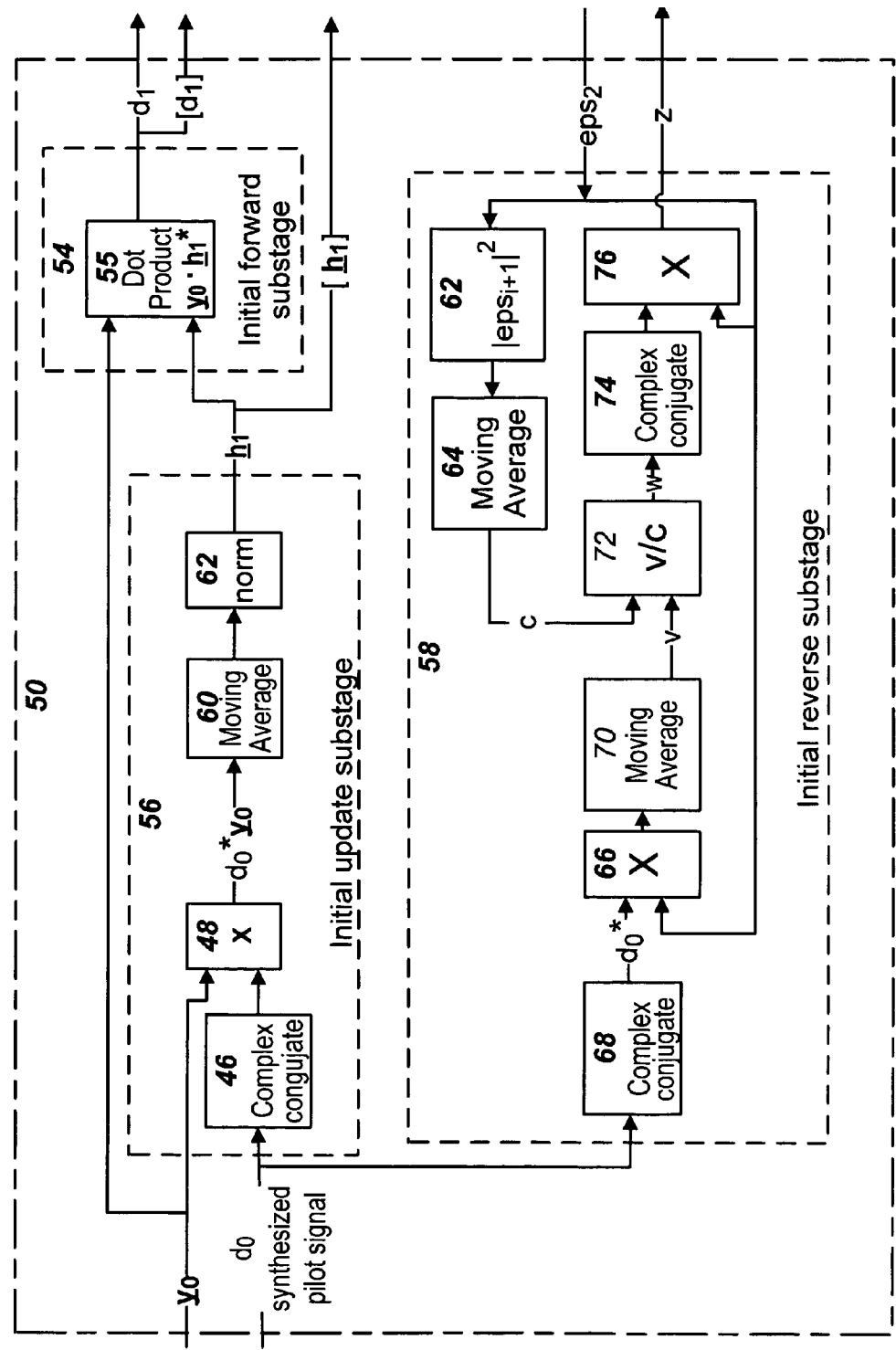
FIG. 3 illustrates the structure of the initial stage of the Despain adaptive filter of FIG. 2. The FIG. 3 stage is similar to the other stages of the FIG. 3 filter, which are shown in FIG. 4.
Figure 4:
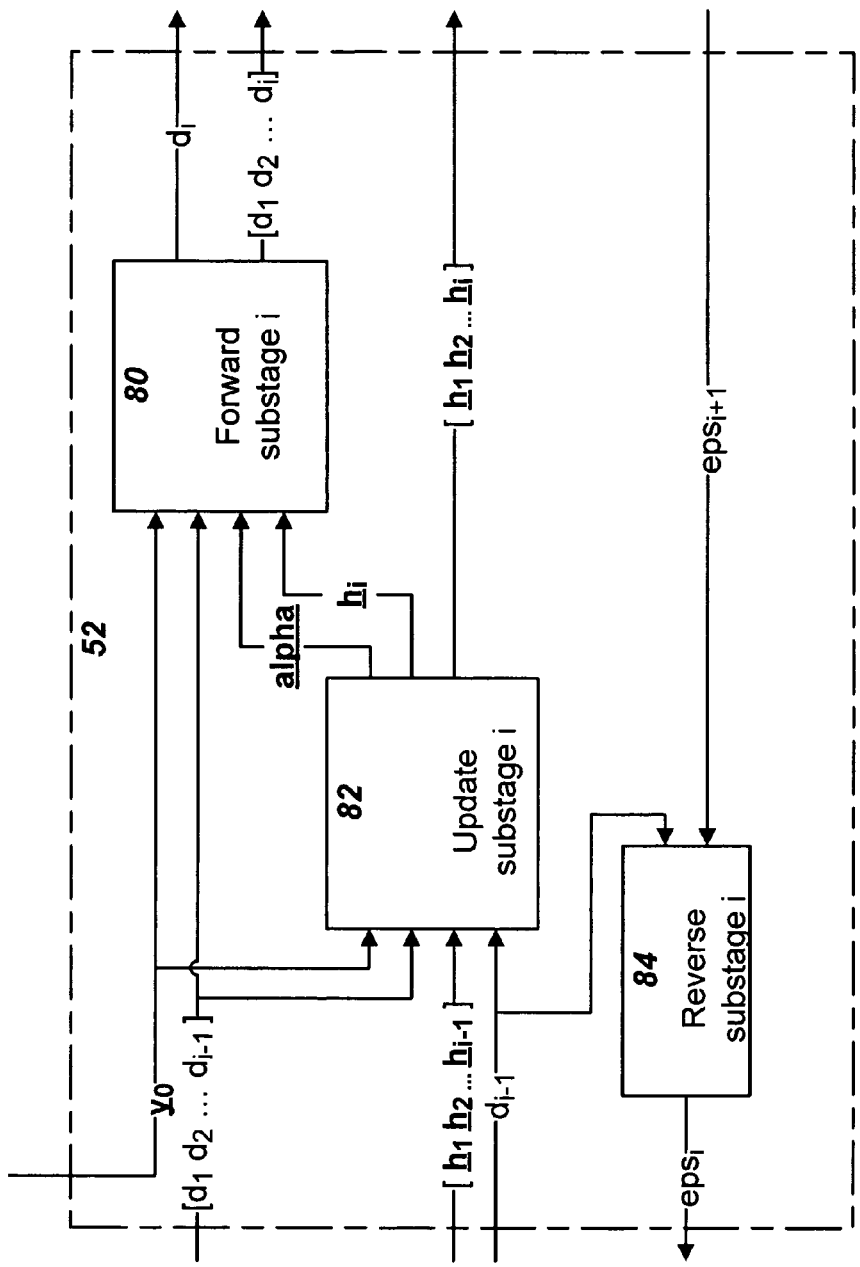
FIG. 4 illustrates the structure of the other stages of the Despain adaptive filter of FIG. 2. The reverse sub-stage of the FIG. 4 stage is shown in FIG. 5.

The initial reverse substage 58 shown in FIG. 3 can be thought of as one stage of a Wiener filter that works on the synthesized pilot signal $d_o$ and the $eps_2$ signal from the next stage. The squared magnitude 62 of $eps_2$ is calculated and is integrated in the moving average block 64 producing a result c. The $eps_2$ signal is multiplied 66 by the complex conjugate 68 of the signal $d_0$, the result of which is also integrated in a moving average module 70 to produce the intermediate signal v. Preferably the moving average modules 64 and 70 use the same window widths (integration intervals) as the moving average module 60. The division 72 of v by c produces w, the Wiener filter coefficient for this initial stage. Next the complex conjugate of w is taken 74 and multiplied 76 by $eps_2$ to produce the result z that is output as the overall result of the complete Wiener filter. For only this initial stage the function of the reverse substage is to adjust the amplitude of the overall filter output so as to match the amplitude of the input signal $d_0$.

The structures of the stages 52, i=2, 3 or 4 other than the initial stage, are shown in FIG. 4. There are three parts to each stage 52, a forward substage 80, an update substage 82 and a reverse substage 84. The reverse substage 84 of the stage 52 is shown in FIG. 5.

Figure 5:
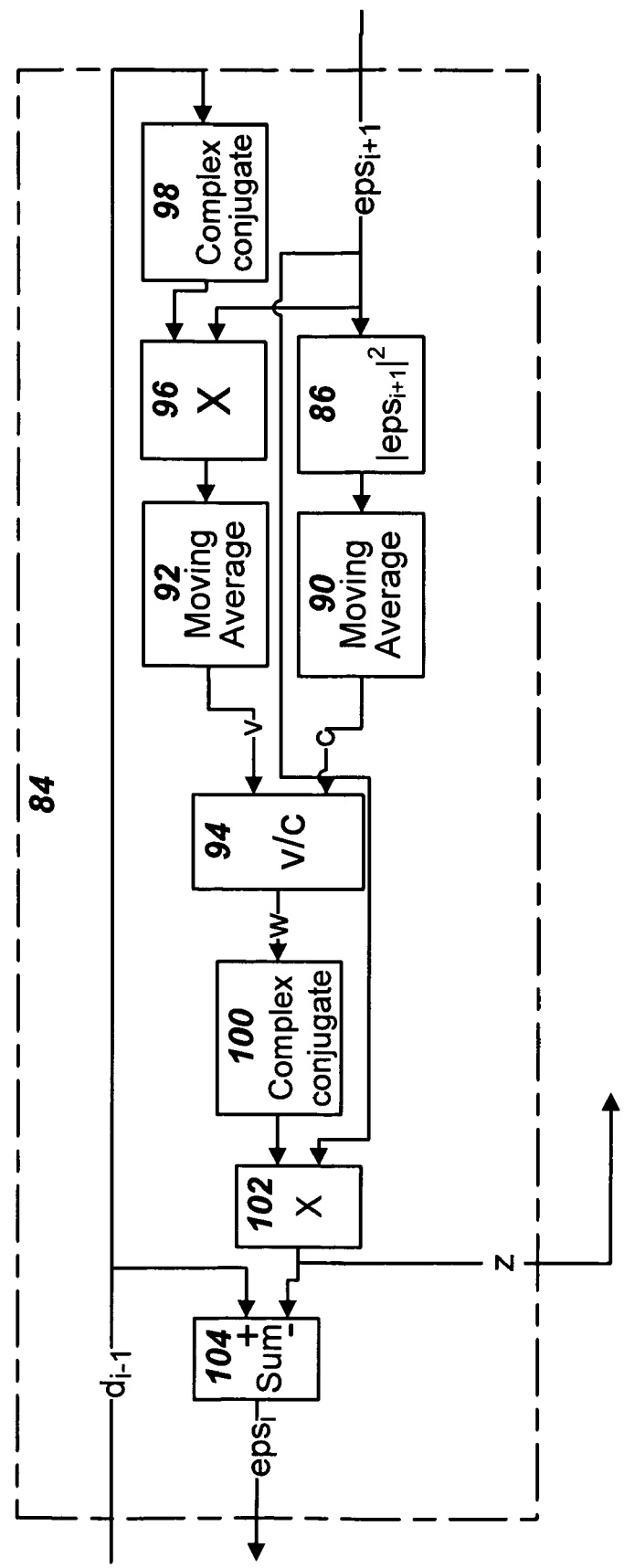
FIG. 5 illustrates the structure of a reverse sub-stage of the FIG. 4 adaptive filter stage.

The reverse substage 84 shown in FIG. 5 can be thought of as one stage of a Wiener filter that works on the output $d_{i-i}$ from the previous (i–1) stage and the signal $eps_{i+1}$ from the next stage. In the case of the last stage, stage n, the value $d_n$ from the forward substage of stage n is used as the $eps_{i+1}$ input to the reverse substage n. The squared magnitude of this signal, $|eps_{i+1}|^2$, is calculated 86 and integrated 90 over a sliding window as described above producing the signal c. Moving average calculations with spans possibly the same or possibly longer from those used in the initial stage may also be employed in the reverse substage blocks 92 and 90. Next an intermediate scalar variable v is calculated as the product 96 of $eps_{i+1}$ and the complex conjugate 98 of $d_{i-1}$ integrated 90 over a sliding window. The ratio 94 of v divided by c produces the weight w for this stage. Next the complex conjugate 100 of w is multiplied 102 by $eps_{i+1}$ to produce the signal z. z is subtracted 104 from $d_{i-1}$ to create the output signal, $eps_i$. The first stage of the FIG. 2 filter outputs a copy of z as the overall output of the complete Wiener filter.

Figure 6:
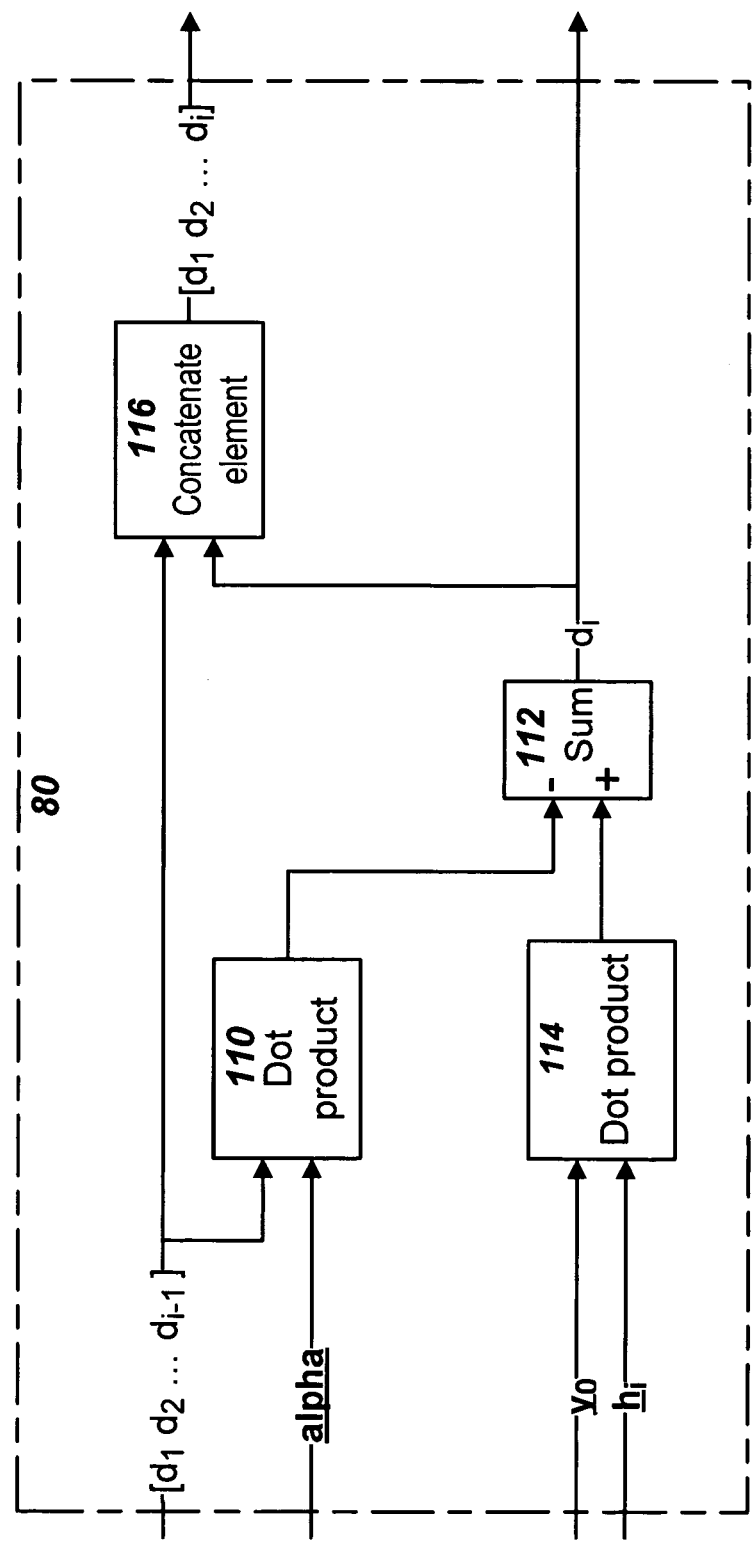
FIG. 6 illustrates the structure of a forward sub-stage of the FIG. 4 Despain adaptive filter stage.

The i-th forward substage 80 is shown in FIG. 6. The dot product 110 of the vector of signals $[d_1\ d_2\ \ldots\ d_{i-1}]$ and the coefficient vector alpha from the update substage is summed 112 with the dot product 114 of the input signal vector $\underline{y}_0$ and the filter coefficients $\underline{h}_i$ from the update substage to produce the output signal $d_i$. Also, the vector $[d_1\ d_2\ \ldots\ d_i]$ is formed at block 116 and sent to the next stage.

Figure 7:
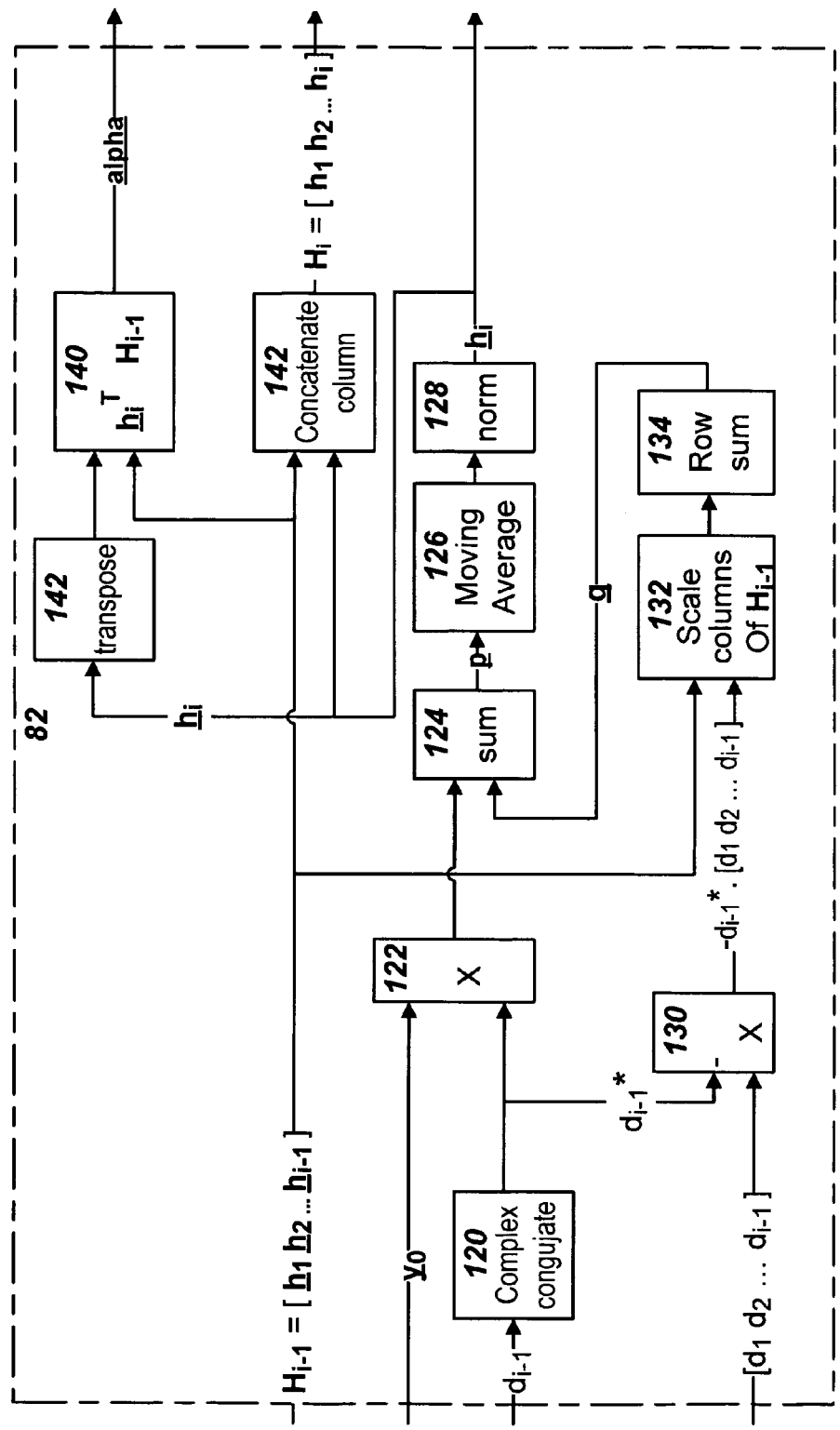
FIG. 7 illustrates the structure of an update sub-stage of the FIG. 4 Despain adaptive filter stage.

The i-th update substage 82 shown in FIG. 7 has as inputs the vector input signal $\underline{y}_0$, the previous filter coefficients $H_{i-1}=[\underline{h}_1\ \underline{h}_2\ \ldots\ \underline{h}_{i-1}]$, $d_{i-1}$ and the vector $[d_1\ d_2\ \ldots\ d_{i-1}]$. The complex conjugate 120 is taken of the $d_{i-1}$ signal from the previous stage and then multiplied 122 with the input vector signal $\underline{y}_0$. Next a signal $\underline{q}$ is added 124 to this result and the intermediate result $\underline{p}$ is generated. The norm 128 of the moving average 126 of $\underline{p}$ is the result $\underline{h}_i$. The signal $\underline{q}$ is generated by multiplying 130 the vector $[d_i\ d_2\ \ldots\ d_{i-1}]$ by the negative of the complex conjugate 166 of $d_{i-1}^*$ of $d_{i-1}$, and using this vector to scale 132 the matrix H. The rows of the scaled matrix are summed 134 to produce the intermediate vector $\underline{q}$. The product 140 of the transpose 142 of $\underline{h}_i$ with the matrix $H_{i-1}$ generates the vector alpha, which goes to the forward substage of the current stage. The $\underline{h}_i$ coefficients are concatenated 142 with the matrix $H_{i-1}$ as a new column to produce the matrix $H_i$ which is sent on to the next stage.

In each stage 52 after the initial stage 50, the integration interval of the moving average blocks 126, 90 and 92 can be set to be the same as that employed for the initialization stage with good results. Under some circumstances a modified integration interval for the later stages 52 can improve results or reduce computational complexity. The modification can be determined either experimentally in the environment of interfering signals and noise or calculated from the known properties of the interfering signals and the noise received by the receiver. For slowly changing interfering signal and noise parameters, longer integration times in the later stages 52 may be advantageous.

In the FIG. 2 filter, the observations y of the channel are averaged over multiple symbol times (the "integration interval"), and these averaged values are used to compute the vector $h_1$ that comprises the first stage of the FIG. 2 filter as well as the other $h_i$ vectors for the subsequent stages of the FIG. 2 filter. The FIG. 2 implementation of the Despain filter estimates the filter parameters by averaging over a number of symbol periods because averaging over a single symbol period is not sufficient to provide an accurate estimate of the channel due to noise and interference. Although channels are non-stationary, the variations in the channel statistics over a few (e.g., eight to sixteen) symbol times are not very large, and averaging over this interval produces better estimates of the channel statistics than averaging over a single symbol time. Averaging over this eight to sixteen symbol interval also provides better estimates than averaging over significantly longer intervals would provide.

Samples y of the channel nearest in time to the symbol being decoded best represent the state of the channel, and specifically the channel statistics, at the time the samples corresponding to the symbol being decoded were received. The symbol being decoded can be any one of the symbols included in the integration interval, but the symbol in the middle is the one nearest in time to all the samples included in the integration interval. Consequently, in a preferred embodiment, the filter decodes the symbol in the middle, or very near the middle, of the integration interval using the filter parameters determined from the data spanning the integration interval.

Since the sample values close in time to the symbol being demodulated or decoded (detected) better reflect the statistics of the channel corresponding to the time of the symbol, preferred implementations of the FIG. 2 filter may weight the sample value near the symbol more than those further away in time in computing averages over the integration interval. For example, if the integration interval is fifteen symbol times, those values at the time of the middle symbol (symbol 8), presuming this is the symbol being demodulated, and the two adjacent symbols might be weighted more strongly than the other symbols. Other variable weighting schemes are apparent. Such a variable weighting may improve the estimate of the channel statistics in various implementations of the Despain filter.

The strategies discussed above apply to other filter estimation methods where an average of samples over more than a single symbol time is used to estimate filter parameters. In particular, this discussion applies not only to the FIG. 2 filter, but also may be applied to the FIG. 8, FIG. 9 and FIG. 10 filter discussed below and other filters suited for use as the filter 18 of the FIG. 1 receiver. Still other implementations of adaptive filters, including for applications other than CDMA or wireless, may advantageously use the above-described strategies.

It is possible to reduce the complexity of the FIG. 2 implementation of the Despain adaptive filter for certain applications with little loss of performance. This reduction in complexity is based on the observation that many of the paths or contributions calculated within the FIG. 2 filter have insignificant energy and may have negligible effect within the filter. The vector $y_0$ is the input to the FIG. 2 filter. Each position in $y_0$ represents a particular delay in the signal path or one point at which a path in the multipath set might appear. The FIG. 2 adaptive filter processes this vector $y_0$ as a filter bank, with one filter for each possible path represented within $y_0$. Many of the possible paths represented in $y_0$ are not present, or will be present with very small energy, and in general only a few paths will contain most of the energy received from the base station.

The fact that some paths have significant energy and many do not has practical effects on a receiver filtering signals from this channel. For the FIG. 2 or similar filters, portions of the filter will have little or no impact in recovering the signal. The filter element for each stage i of the FIG. 2 adaptive filter is expressed as a vector $h_i$. In practice, most of the elements of each $h_i$ have small amplitude (i.e., small energy), while a few have larger amplitude. For example, the first stage, $h_1$, will have larger amplitude elements corresponding to the multipath components of the signal, since this stage is basically a matched filter for the physical delay characteristics of the channel. Those components of the filter that do not significantly contribute to the filter might advantageously be neglected to reduce complexity and cost. What is meant by "neglected" here is that filter circuitry or elements need not be provided for the component. As a practical matter this may mean that fewer filter elements are included in the filter or, for digital signal processor (DSP) implementations, the DSP would not have to be programmed or configured for those filter elements and so an overall smaller or less powerful DSP might by used.

It is consequently possible to provide a filter for a CDMA system that allocates circuits to those delays or $y_0$ components that have significant energy and neglects delays or $y_0$ components that are unlikely to contribute significantly to the filtering of the signal. Most receivers for CDMA systems are designed to accommodate unpredictable channel characteristics. This is true of the FIG. 2 implementations of the Despain adaptive filter. Different portions of the filter within a receiver will be important for different propagation channels. Thus, to provide a filter for a CDMA channel that efficiently allocates circuitry to delays or $y_0$ components that represent the most significant energy components to the signal, it is desirable to detect those delays or components and then adaptively allocate the circuitry to those delays or components.

Figure 8:
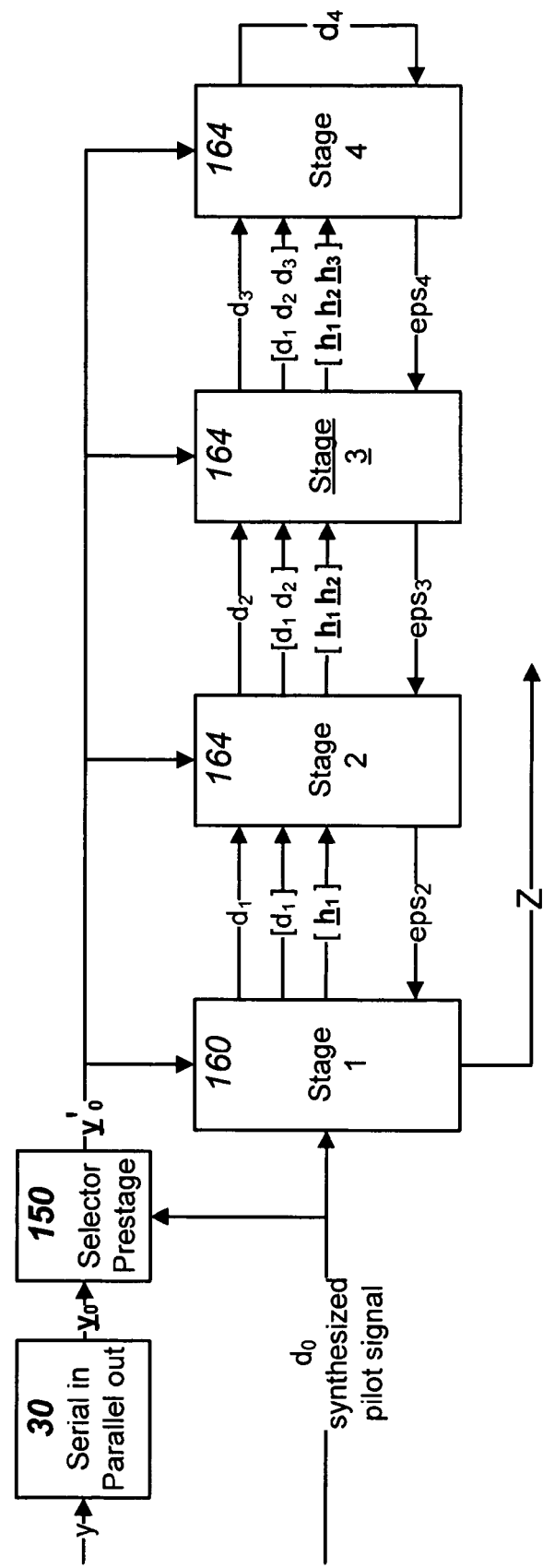
FIG. 8 illustrates an implementation of the Despain adaptive filter in which a preprocessing stage is provided for the various stages of the filter.

FIG. 8 shows an implementation of the Despain adaptive filter in which the filter identifies energetically significant delays or $y_0$ components from the received signal. The filter allocates circuits within the filter according to the energetically significant delays or $y_0$ components identified by the filter. This allows a smaller, more efficient implementation of the FIG. 8 filter to achieve performance similar to an implementation of the FIG. 2 filter.

A receiver as shown in FIG. 1 processes a received signal as a number N of discrete elements making up the signal $y_0$, with the N discrete elements corresponding to N possible delays or components. N may vary considerably depending on the communication system and the receiver. N is a parameter typically selected for any particular implementation of a filter. In practical implementations, a subset M of the N elements of the received signal $y_0$ will include most of the energy corresponding to a transmitted signal. Under these assumptions M is a number less than N. The FIG. 8 implementation of the Despain adaptive filter selects the M energetically significant elements out of the N received elements of $y_0$ and uses the selected number M of paths that will be used in the remainder of the filter, corresponding approximately to the M received paths with the most energy. M may be predefined in some implementations of the filter and in other presently preferred implementations may be determined from the input signal $y_0$.

The FIG. 8 filter receives a signal $y_0$ including N discrete elements corresponding to N possible delays or components. In the embodiment illustrated in FIG. 8, the prestage filter 150 analyzes the input signal $y_0$ and identifies those M elements of $y_0$ that are more energetic or more significant. Preferably the prestage filter 150 has the same circuit elements as the full N element $h_1$ filter stage shown in FIG. 2, but implemented with reduced precision. Prestage 150 uses low precision multipliers and adders and so is more computationally efficient and, generally, faster. The M elements with approximately the most energy are identified by the prestage 150 in the initial analysis, and the filter generates a vector of length M, $\underline{y}'_0$, from the input signal vector $\underline{y}_0$ with $\underline{y}'_0$ containing the elements of $\underline{y}_0$ corresponding to these M highest energy paths. These M elements of $\underline{y}'_0$ are passed on to the full precision stages 160, 164 of the filter. Four full precision stages are illustrated, but there generally may be any number of full precision stages in the FIG. 8 Despain filter. As with the FIG. 2 filter, filter 160 preferably is a matched filter and the other filters 164 are generally more responsive to interference than the physical delay channel.

After prestage 150 identifies the more significant components from the input signal, the filter adapts or configures its circuitry according to the identification of those significant components. Stages 50, 52 of the FIG. 2 full precision Despain filter operate on vectors $\underline{y}_0$ of length N, with the filters 50, 52 using vectors and matrices of corresponding dimension. By comparison, filter stages 160, 164 operate on vectors $\underline{y}'_0$ having the reduced dimension M. Preferably, only the selected M elements of the FIG. 8 filter stages 160, 164 are operative on the reduced dimension vector $\underline{y}'_0$. As with the FIG. 2 implementation, the FIG. 8 implementation of the Despain adaptive filter can be used as the adaptive filter 18 of FIG. 1.

The filter prestage 150 is a low precision filter stage, incorporating low precision multipliers and adders. As a result, the complexity of the circuitry used to estimate the parameters of the prestage will be much lower than higher precision circuitry. The resulting prestage filter will be much less precise than a full precision filter, but it will be sufficiently precise to identify which elements of the filter stage have the larger amplitudes (which correspond generally to the paths containing the most energy). Based on the low precision version of $h_1$ computed in the prestage 150, a subset M of the potential filter elements of $h_1$ with the highest amplitudes are selected. The filter generates a vector $\underline{y}'_0$ consisting of the selected M elements of $\underline{y}_0$. The full precision stages $h_i$ 160, 164 receive the vector $\underline{y}'_0$ and operate on vector $\underline{y}'_0$ using the M elements of the filters $h_i$ 160, 164.

The full precision version of filters $h_i$ 160, 164 is determined for the M elements chosen as a result of the pre-stage filtering calculation. The non-selected elements are assumed to make comparatively small contributions to the overall filter and the non-selected elements are ignored. Generally, the contribution from the ignored filter elements will be negligible. The FIG. 8 filter produces approximately the same $h_i$ filters 160, 164 as for the FIG. 2 implementation of the Despain filter at less computational cost. Because fewer elements are used in the full precision stages, the FIG. 8 filter is more computationally efficient than the full precision FIG. 2 filter even considering the addition of the prestage filter 150.

In an example where there are thirty-two possible paths and eight are selected for processing within the filter, the circuitry required for processing will have reduced complexity, as compared to the complexity of processing all paths, by a factor of about four. The complexity of the initial estimator prestage 150 is approximate proportional to the square of the number of bits of precision used in the calculation because the computationally expensive operations are multiplies, and a multiplier cost is proportional to the product of the bits in the two operands. In preferred implementations the complexity of the initial processing to select the filter elements for each stage will be approximately an order of magnitude less than the complexity for each stage of the original adaptive filter of FIG. 2.

During soft handoff in a CDMA network, a mobile unit may be receiving signals from two or three base stations and combining these signals to extract the data traffic. In existing mobile receivers, two or more fingers of at least one rake receiver are needed, one finger for each base station transmitting to the mobile unit. A receiver like that of FIG. 1 implementing two distinct instances of the efficient adaptive filter of FIG. 8 as the adaptive filter 18 of FIG. 1 will be even more efficient in accommodating soft handoff between two or more base stations than such a rake receiver implementation.

Figure 9:
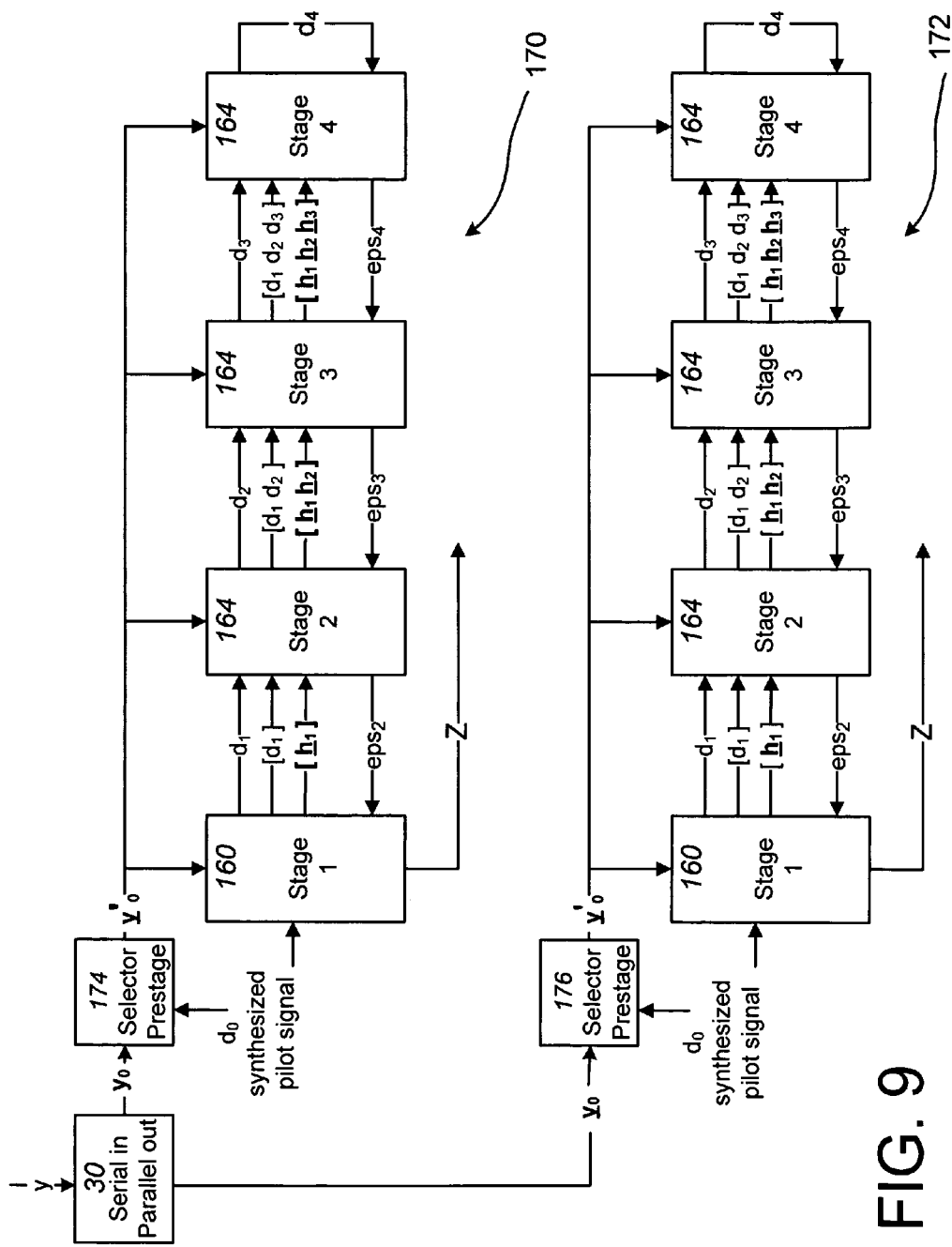
FIG. 9 illustrates a modification of the Despain adaptive filter in which two or more of the reduced complexity FIG. 8 filters are implemented to facilitate soft handoff between cells.

In order to receive two or more base stations at a single receiver, a separate filter is required for the signal from each base station. The signals are processed to produce a combined received estimate of the transmitted data after each signal has been filtered. Even though two independent filters are used in this implementation, as illustrated in FIG. 9, each of the distinct filters can be implemented with reduced complexity. In this way it is possible to reduce the overall circuitry for the needed adaptive filters and produce a more efficient receiver.

The efficiency of the FIG. 9 architecture for soft handoff is achieved by dividing the available full precision circuitry into two (for the two base station case) or three (for the three base station case) subsets. One subset of the adaptive filter circuitry is devoted to each of the base stations during soft handoff. For example, for the two base station case with eight filter elements (K=8), four (K/2=4) full precision elements are chosen for each of the two needed 170, 172 filters (one for each base station) shown in FIG. 9. The filter 170, 172 for each of the two base stations will occasionally have lower performance than an eight element full precision filter would have for a specific base station, but the combined output signals after filtering the two base station cases will be nearly as good as if two complete full precision filters (such as shown in FIG. 2) had been used. This performance would be achieved with half as much circuitry as would be required using two complete full precision filters.

The FIG. 9 strategy of providing two distinct base station filters 170, 172 provides a prestage 174, 176 for each of the base stations to estimate which filter elements are required for the full precision filter stage for each base station. A separate prestage 174, 176 is used for each base station because each base station uses a different identifying PN code. The aggregate circuitry required for two base stations will, however, be much less than if a full precision filter were dedicated to each base station. Note that an implementation of the FIG. 9 filter for the two base station system generally requires two sets 170, 172 of the reduced precision circuits illustrated in FIG. 8. Generally it is possible to use fewer full precision stages 164 in each set 170, 172 of the FIG. 9 circuitry than a typical implementation of the FIG. 8 filter for a single base station. In the two base station application, both sets 170, 172 of circuitry may be implemented within a single DSP. The receiver may generate a new instance of the two base station configuration of the FIG. 9 circuitry for each soft handoff event, or the receiver may maintain the two sets of circuitry present and active for use when needed for a second base station such as during soft handoff.

Figure 10:
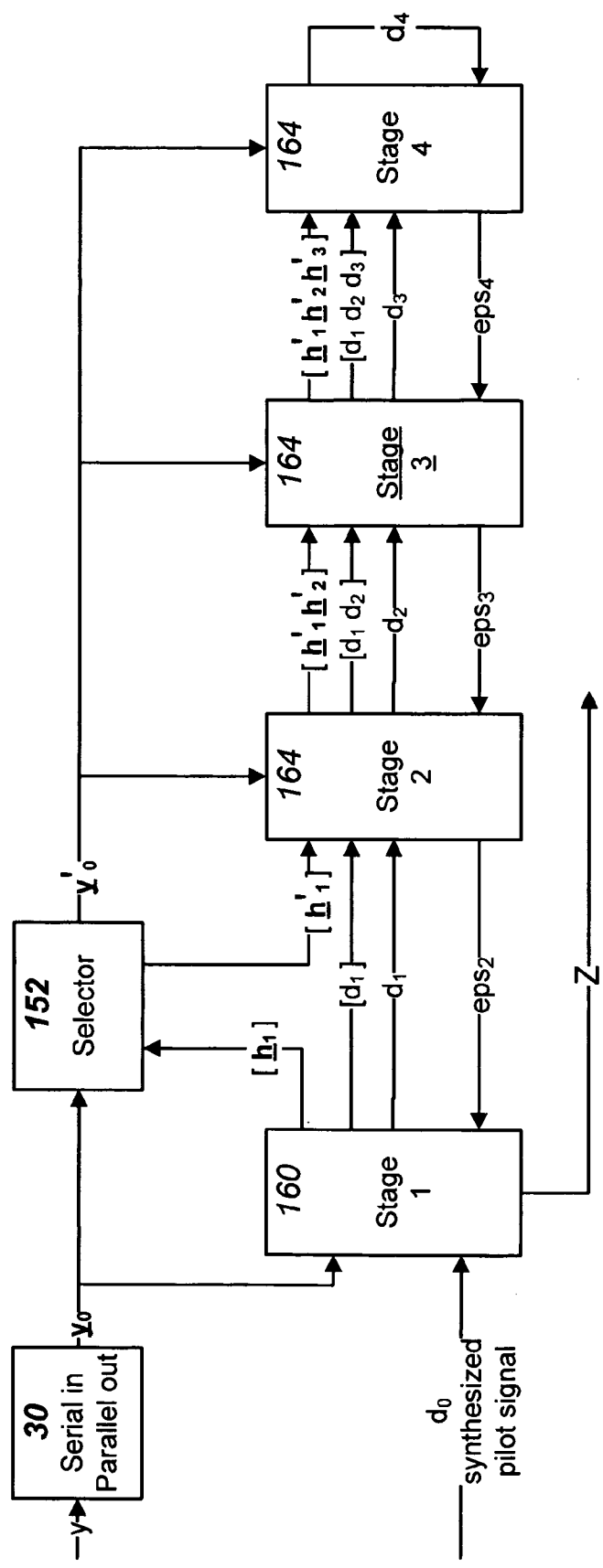
FIG. 10 illustrates another implementation of the Despain adaptive filter in which a full precision matched filter stage is used to select filter delays for further processing.

FIG. 10 is an alternative implementation of the adaptive filter shown in FIG. 8. Instead of using a low complexity prestage before the full precision determination of $h_1$ in the first stage, the FIG. 10 adaptive filter determines the initial, matched filter stage $h_1$ with full precision for all N paths within received vector $\underline{y}_0$. This preferably is done using the signed addition method described above, since the filter bank correlations are with the known PN code. The complexity of this calculation will therefore be low compared with performing the same correlations as vector multiplications. Vector multiplications will, of course, be required in subsequent stages. In the FIG. 10 implementation of the Despain adaptive filter, the first stage 160 is generally the same as those 50, 160 described above with respect to FIGS. 2 and 8. Each of these first stage filters, including 160 in FIG. 10, can be implemented with or without the signed addition strategy discussed above. The subsequent stages 160 of FIG. 10 are generally the same as those 52, 164 discussed above with respect to FIGS. 2 and 8, but preferably operate with reduced dimension data and filter vectors.

After the FIG. 10 adaptive filter determines the full N element $h_1$ vector at the first stage 160 in FIG. 10, the FIG. 10 filter provides the N element vector $h_1$ to a selector stage 152, which selects from $h_1$ the M elements of $h_1$ with the greatest amplitude and produces the length M vector $h'_1$. M may be a fixed parameter for the filter or might be variable depending on the environment and other circumstances. The selector stage 152 of FIG. 10 differs from the selector prestage of FIG. 8 at least in that the selector stage 152 (FIG. 10) does not determine filter coefficients directly from the input signal. Rather the selector 152 preferably determines which elements of the first filter vector $h_1$ have the larger amplitudes and selects from the signal $h_1$ the M elements having the larger amplitude to make up the vector $h'_1$.

The FIG. 10 selector stage 152 outputs the M element vector $h'_1$. The FIG. 10 selector stage 152 also produces the length M vector $y'_0$ whose elements correspond to the elements that were selected to produce the vector $h'_1$. These M elements in $h'_1$ and $y'_0$ correspond to the signal paths with the most energy. This reduced dimension input vector $y'_0$ is provided to each of the subsequent stages 164 in parallel. The two vectors $h'_1$ and $y'_0$ are both passed to the first (stage 2) of the subsequent stages 164 and the first of the subsequent stages performs adaptation and filtering using the M element vectors $h'_1$ and $y'_0$. Stages 3 and 4 of the subsequent stages 164 of FIG. 10 each operate on the vectors $y'_0$ and $h'_i$, and the subsequently produced vectors $h'_i$, all of which have length M. As a consequence, the complexity of each of these subsequent stages 164 (stages 2, 3 and 4) in FIG. 10 is reduced approximately in the ratio of N to M. Because these latter stages use vector multiplications, the reduction in complexity from using an M element vector (rather than an N element vector) is particularly advantageous for these stages.

The FIG. 10 implementation of the Despain adaptive filter has the advantage of low complexity compared with the implementation of FIG. 2. This advantage of the FIG. 10 filter is shared with the FIG. 8 filter, although to a slightly lesser extent. The FIG. 10 filter has an advantage compared with the FIG. 8 filter in that it may better estimate the paths with the highest energy. It will, in general, better estimate the value d1. Since d1 contributes importantly to the output of the filter, the FIG. 10 filter may perform somewhat better than the FIG. 8 filter. Consequently, at the present time, FIG. 10 represents a particularly preferred implementation of the Despain filter for many applications, including CDMA wireless communication applications.

Further information with respect to the Despain filter can be found in U.S. patent application Ser. No. 10/894,913, "Use of Adaptive Filters in CDMA Wireless Systems Employing Pilot Signals," filed Jul. 19, 2004 and in U.S. patent application Ser. No. 10/348,670, "Adaptive Multistage Wiener Filter" and in WIPO publication number WO 03/085830 A1. Information regarding another multistage Wiener filter is described in U.S. patent application Ser. No. 09/933,004, "System and Method for Adaptive Filtering," published as US 2002/0152253. Each of these applications and publications are incorporated by reference in their entirety and for all purposes.

Figure 11:
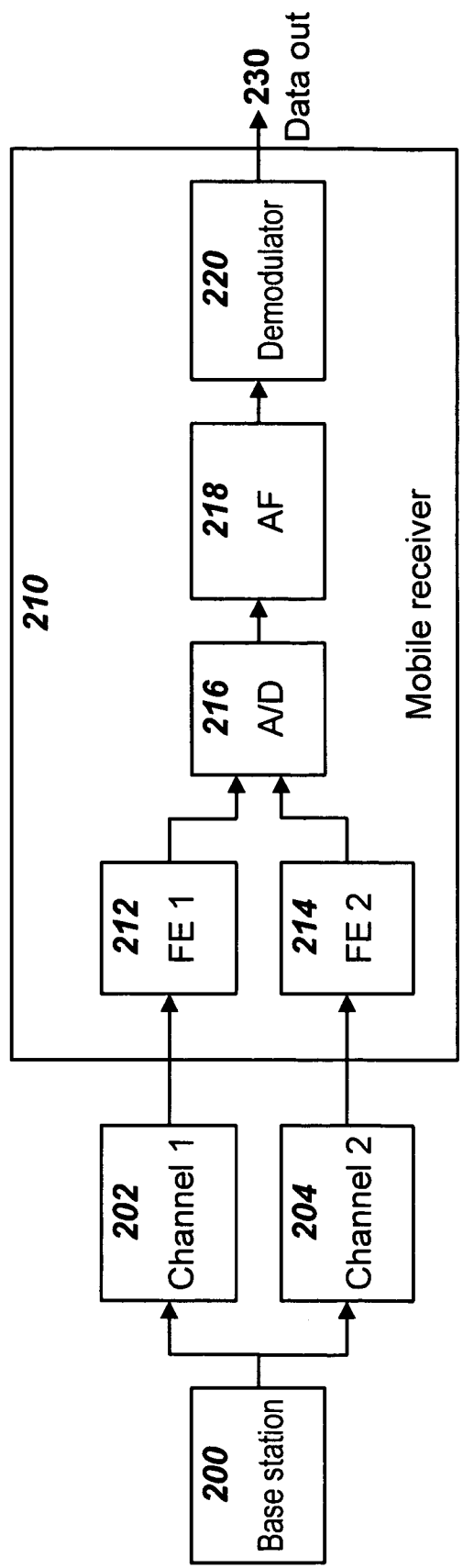
FIG. 11 illustrates a downlink for a CDMA system with two antennas in a receiver according to preferred embodiments of the invention.

A diversity of independent antennas and receiver front ends tuned to the same transmitter signal can be employed to improve the performance of a radio system if the separate signals received can be properly combined before detection. Adaptive filters according to the present invention are well suited for this task and are simply expanded to handle the increased data processing. FIG. 11 illustrates how an adaptive filter as illustrated in FIG. 2, 8, 9 or 10 can be employed for a two-antenna example. Expanding this example to more than two antenna systems will be apparent to those skilled in the art.

In the two antenna case, there are two slightly different channels 202 and 204 between the base station and each of the two antennas. Two front end modules 213 and 214 receive these signals and down convert them to baseband. A two-channel analog to digital (A/D) converter 216 (or two A/D converters) accepts the two analog inputs from the two radio front-end modules, and then produces a digital representation of each of the input signals. This combined stream of digital sample values is then sent to an adaptive filter 218 in accordance with the invention. The output of adaptive filter 218 is, as before, sent to a demodulator 220.

The adaptive filter 218 is preferably identical to those discussed above except the processing bandwidth preferably is doubled over that of the previously discussed filters. There are many ways well known to those skilled in the art to double the processing bandwidth. As compared to the FIG. 2 filter implementation, for example, the serial-in, parallel-out shift register can be doubled in size to produce double the number of parallel outputs at the same rate as before. Then each stage of the filter can be enlarged to accept, in parallel, a vector $y_0$ of twice the previous size. The appropriate data paths through each stage are thus similarly doubled in size (the vectors etc., are doubled in length). The time window representing the desired delay spread preferably is adjusted so that the strong signals from the base station to both antennas are within the window. The processing otherwise remains the same.

The filtered signal result can be substantially improved by this method of diversity combining the multiple antenna signals while equalizing all the inputs for multipath propagation effects. For a two-antenna system, depending upon the particular propagation channels and the relative physical separation and orientation of the two antennas, simulation results indicate effective SNR (signal-to-noise) ratio improvements of between about 2 dB to 10 dB by using two antennas. Employing even more independent antennas is expected to offer even more improvement at the cost of providing the receiver front-end processing and increasing the $y_0$ vector data path correspondingly in the adaptive filter.

The various receivers of FIGS. 1-11 have been described with reference to current and planned CDMA wireless networks. Future modifications and improvements of CDMA networks are expected and aspects of the present invention are expected to find application in such future networks to the extent the future networks use a pilot or like channel. It should be noted that the conclusions drawn here apply to the WCDMA system in the manner discussed as well as other DSSS CDMA based communication systems.

Particularly preferred embodiments of this invention provide a CDMA receiver solution providing equalization and interference rejection, at a modest computational expense, without knowledge of any underlying user/network modulated information, while providing a solution that improves intercell interference and tracking/mitigating of multipath profiles known to occur in cellular networks. In many instances, the coding and spreading gains provided in CDMA 2000-1x as implemented according to the above discussion are sufficient for reliable communication at desired bit rates with gains in multipath reception and interference rejection.

The implementations and strategies discussed here have been presented in terms of wireless applications of CDMA. This is not intended to be limiting. Rather, the reduced complexity implementations and complexity reduction strategies discussed here apply generally in the context of the reduced rank multistage Wiener filter (MWF). The MWF may be applied in many situations as, for example, discussed in the above-incorporated U.S. patent applications and the literature on MWF. Other communications applications of MWF, for which the complexity reductions described in this application are directly applicable, include orthogonal frequency-division multiplexing (OFDM) systems for both wireless and wire line, and digital subscriber line (DSL) systems.

The present invention has been described in terms of certain preferred embodiments. Those of ordinary skill in the art will appreciate that various modifications might be made to the embodiments described here without varying from the basic teachings of the present invention. Consequently the present invention is not to be limited to the particularly described embodiments but instead is to be construed according to the claims, which follow.

What is claimed is:

1. A communication system, comprising:
a receiver having an adaptive filter coupled to receive an input signal comprising a plurality of user signals and a pilot signal, the input signal characterized by an orthogonal code modulation,
wherein the adaptive filter has a matched filter stage that filters at least a portion of the input signal,
wherein the adaptive filter has a prestage filter that filters the input signal using a level of precision lower than the matched filter stage and identifies a set of filter elements within the matched filter stage, and
wherein the matched filter stage filters at least a portion of the input signal using the set of filter elements identified by the prestage filter and wherein the prestage filter and the matched filter stage each determines a set of filter coefficients using a cross correlation between at least a portion of the input signal and a reference signal generated by the receiver, using an integration for an integer number of two or more complete orthogonal code periods in the respective cross correlations, the adaptive filter filtering at least a portion of the input signal in the matched filter stage and in at least one other adaptive multistage filter stage, the matched filter stage and the at least one other adaptive multistage filter stage receiving the at least a portion of the input signal in parallel.

2. The system of claim 1, wherein the prestage filter determines a set of comparatively energetic signal elements using a cross correlation between a pilot signal and the input signal, the adaptive filter comprising an adaptive multistage Wiener filter.

3. A communication system, comprising:
a receiver having an adaptive filter coupled to receive an input signal comprising a plurality of user signals and a pilot signal, the input signal characterized by an orthogonal code modulation,
wherein the adaptive filter has a matched filter stage that filters at least a portion of the input signal,
wherein the adaptive filter has a prestage filter that filters the input signal using a level of precision lower than the matched filter stage and identifies a set of filter elements within the matched filter stage, and
wherein the matched filter stage filters at least a portion of the input signal using the set of filter elements identified by the prestage filter and wherein the orthogonal code is a Walsh code, an orthogonal variable spreading factor code or another orthogonal code, and the adaptive filter is part of an adaptive multistage Wiener filter and wherein the adaptive filter filters at least a portion of the input signal in at least two adaptive filter stages, the at least two adaptive filter stages receiving the at least a portion of the input signal in parallel.

4. A communication system including a receiver, the receiver comprising:
an adaptive filter coupled to filter an input signal comprising a plurality of user signals and a pilot signal, the input signal having an orthogonal code modulation defined by a transmitter, the adaptive filter including at least one filter stage that determines at least one set of filter coefficients by averaging or integrating over an integer number of two or more complete orthogonal code periods,
the adaptive filter comprising a prestage receiving N elements of the input signal and identifying from the N elements of the input signal a set of M elements for processing within the adaptive filter,
the adaptive filter filtering the input signal using M elements in each stage of two or more other stages of the adaptive filter, the prestage operating at lower precision than any of the one or more other stages of the adaptive filter, wherein the prestage receives the N elements of the input signal and outputs a modified input signal having the M selected elements that is then used within at least a portion of the adaptive filter and wherein the adaptive filter comprises a matched filter stage and at least one second filter stage, the matched filter stage and the at least one second filter stage receiving the modified input signal in parallel.

5. The system of claim 4, wherein the prestage selects the M elements based on energy within the M elements as compared to energy within non-selected elements.

6. The system of claim 4, wherein the adaptive filter has at least one set of filter coefficients determined in part from a multiplication of at least a portion of the input signal by a synthesized pilot signal, the synthesized pilot signal synchronized with the input signal, and wherein the multiplication is performed as a single series of signed addition operations between respective components of the at least a portion of input signal and the synthesized pilot signal.

7. The system of claim 4, wherein both the prestage and the matched filter stage determine filter coefficients from a cross correlation between at least a portion of the input signal and a reference signal generated by the receiver, using an integration over the integer number of two or more complete orthogonal code periods in the cross correlation.

8. The system of claim 7, wherein the orthogonal code is a Walsh code and the adaptive filter is a multistage Wiener filter.

9. The system of claim 4, wherein the receiver comprises first and second prestages, each receiving the N elements of the input signal and identifying from the N elements a smaller set of elements for processing within at least two corresponding adaptive filter stages, each of the prestages operating at lower precision than at least one matched filter stage of the adaptive filter.

10. The system of claim 9, wherein the first and second prestages are adapted to identify first and second base stations in a soft handoff operation.

* * * * *